Jan. 30, 1962     H. G. ROGERS     3,019,124
MULTICOLOR PHOTOSENSITIVE FILM AND PROCESS OF MAKING THE SAME
Filed April 12, 1956     3 Sheets—Sheet 1

INVENTOR
Howard G. Rogers

BY Brown and Mikulka
and
Robert E. Corb
ATTORNEYS

Jan. 30, 1962 H. G. ROGERS 3,019,124
MULTICOLOR PHOTOSENSITIVE FILM AND PROCESS OF MAKING THE SAME
Filed April 12, 1956 3 Sheets-Sheet 3
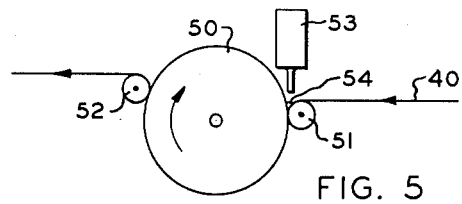
FIG. 5
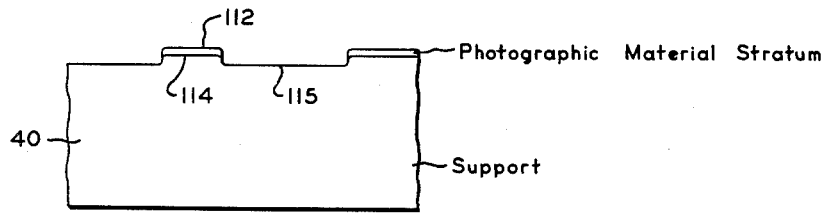
FIG. 6a
FIG. 6b
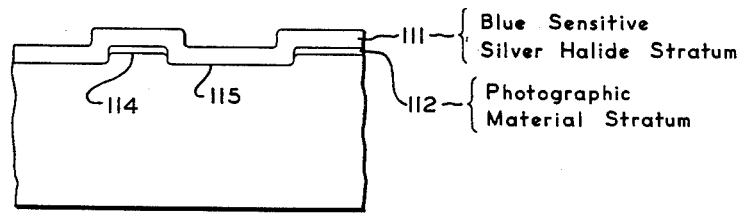
FIG. 7
INVENTOR
Howard G. Rogers
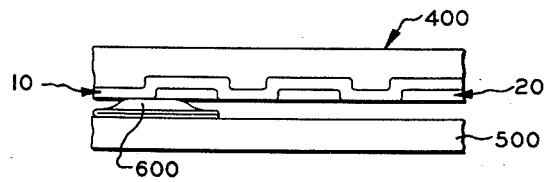
BY
ATTORNEYS

United States Patent Office 3,019,124
Patented Jan. 30, 1962

3,019,124
MULTICOLOR PHOTOSENSITIVE FILM AND
PROCESS OF MAKING THE SAME
Howard G. Rogers, Weston, Mass., assignor to Polaroid Corporation, Cambridge, Mass., a corporation of Delaware
Filed Apr. 12, 1956, Ser. No. 577,711
6 Claims. (Cl. 117—8)

This invention relates to photography, especially to color photography, and more particularly is concerned with photosensitive elements or taking films suitable for carrying out a one-step photographic transfer process, but useful as well for forming photographic originals and reproductions by conventional practices, and to processes for producing said photosensitive elements.

This application is a continuation-in-part of my copending application Serial No. 358,011, filed May 28, 1953, now abandoned.

Objects of the invention are the provision of a photosensitive element for producing an image of a subject in terms of a first dye and at least a second dye and comprising a support carrying on one surface a multiplicity of submacroscopic light-sensitive elemental portions including a first set of elemental portions comprising a light-sensitive silver halide and a color-providing substance for said first dye, and at least a second set of elemental portions comprising a light-sensitive silver halide and a color-providing substance for said second dye, and wherein the elemental portions of at least one of said sets of elemental portions comprise at least two generally coextensive separate and distinct strata located in registered overlying relation, said strata comprising said silver halide, one of said color-providing substances and an exposure-controlling material effective to impart a resultant sensitivity to said one set of elemental portions which differs substantially from the sensitivity of the other of said sets of elemental portions; and particularly a photosensitive element of the character described wherein the elemental portions of each set of elemental portions are substantially uniformly distributed over said support and systematically arranged in a pattern which simulates that of a color screen type of pattern.

Other objects of the invention are: to provide a photosensitive element or taking film of the above-described type including at least two sets of light-sensitive elemental portions and wherein each of the light-sensitive elemental portions of at least one set of light-sensitive elemental portions comprises two separate and distinct strata located in registered overlying relation, said strata including a light-sensitive silver halide, a color-providing substance and an exposure-controlling material, and wherein the color-providing substance and exposure-controlling material are in different strata with the color-providing substance being from the class consisting of dyes and intermediates for dyes whose color is predeterminedly related with the resultant color sensitivity imparted to said elemental portion by the exposure-controlling material; to provide a photosensitive element of the just-described type wherein the color-providing substance is from the class of dyes and intermediates for dyes whose color is substantially the complement of the predominant color of light within the wavelength range by which the elemental portions of said one set are rendered exposable by the exposure-controlling material; and to provide a photosensitive element making use of at least two sets of light-sensitive elemental portions which are particularly suited for providing a multicolor image of subtractive dyes, especially subtractive dyes which are of a color complementary to the color of the light employed to expose the individual elemental portions, or for forming positive images comprising additive dyes and silver.

Still other objects of the invention reside in the provision of processes for producing a photosensitive element by providing on one surface of a support a relief impression having spaced-apart elevated sections which are joined by depressed sections and which are covered with a layer comprising a photosensitive silver halide, an exposure-controlling material and a first color-providing substance, and then providing on said surface a unitary structure having at least two sets of light-sensitive elemental portions by inlaying in the depressed sections of the relief impression at least a layer of silver halide having a resultant sensitivity substantially different from the resultant sensitivity imparted to the first-mentioned layer by said exposure-controlling material and a second color-providing substance substantially different from the first color-providing substance; as well as in the provision of processes wherein three or more sets of light-sensitive elemental portions are provided on a support by providing a relief impression in the light-sensitive structure formed by mounting two sets of light-sensitive elemental portions on the support in the manner previously described, and wherein the elevated sections of the second relief impression are each constituted by a part of at least one of the first-mentioned light-sensitive elemental portions, and then inlaying in the depressed sections of the second relief impression a layer of a silver halide having a resultant sensitivity substantially different from the resultant sensitivity of the first two light-sensitive elemental portions and a third color-providing substance different from the first and second color-providing substances included in the first and second light-sensitive elemental portions.

Still further objects of the invention are to provide processes of the character set forth wherein a support is first covered with material adapted to provide a first set of light-sensitive elemental portions and said relief impression is then formed; and processes which include the step of providing a relief impression in the surface of the support and then coating the elevated sections of the relief with the material for one set of elemental portions and introducing the material for a second set of elemental portions in the depressed sections of the relief, or wherein a relief impression is first provided in a surface of the support and said surface is covered with a material adapted to provide a first set of light-sensitive elemental portions.

Other objects of the invention will in part be obvious and will in part appear hereinafter.

The invention accordingly comprises the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 5 is a schematic representation of a mechanism for forming a relief impression in a support for a photosensitive element;

FIG. 6a illustrates the photosensitive element in the course of construction and after it has been operated upon by the apparatus of FIG. 5;

FIG. 6b shows the photosensitive element of FIG. 6a at a further stage in its construction; and FIG. 7 is a schematic side elevation of a photographic film unit which employs a photosensitive element similar to that of FIG. 1 in association with a print-receiving element and a rupturable container holding a liquid processing composition.

Figure 1:
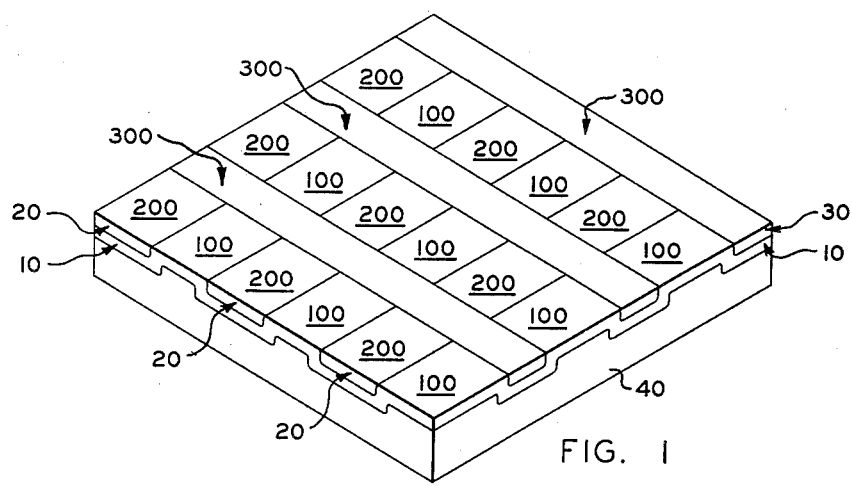
FIGURE 1 is a diagrammatic, perspective view of a preferred embodiment of a negative photosensitive element or a photosensitive taking film.

By way of generalization, the type of photosensitive element or film with which this invention is concerned comprises a support having a multiplicity of submacroscopic light-sensitive elemental portions comprising silver halide carried thereon and made up of at least two sets of elemental portions which are of different character. The elemental portions in each set possess a resultant light sensitivity or are restricted to a resultant light sensitivity different from the wavelength of light by which the elemental portions in each other set of elemental portions are adapted to be exposed whereby the sets of elemental portions are selectively exposable. Additionally, in a film of this character, the elemental portions are substantially uniformly and systematically distributed over the support so as to be in contiguous relation to each other and to form a pattern of elemental portions on the support which simulates a color screen type of pattern. A photosensitive element of this general nature is disclosed in the application of Edwin H. Land, Serial No. 448,441, filed August 9, 1954, now U.S. Patent 2,968,554, granted January 17, 1961.

An important feature of the present invention which distinguishes it from the concepts of the just-mentioned application and those of the prior art resides in the structure of the photosensitive element itself and particularly by mounting the individual light-sensitive elemental portions of one set of light-sensitive elemental portions in spaced-apart relation to each other on one surface of the support for the photosensitive element while seating or recessing the elemental portions of each other set of light-sensitive elemental portions therebetween and in inlaid relation thereto. This construction makes possible the provision of elemental portions which are submacroscopic in size and which comprise at least two separate and distinct strata located in registered overlying relation. The materials comprising each stratum of an elemental portion are related to but different from the materials comprising another stratum of the elemental portion, while the materials comprising the elemental portions of one set of elemental portions are different from the materials comprising the elemental portions of another set interspersed therewith.

In a construction of this nature, each light-sensitive elemental portion may comprise a body provided with a boundary surface which extends outwardly of and generally normal to said support and which terminates in an outer face spaced from the support. The elemental portions are intended to provide a covering over one side of the support and the individual elemental portions in each set of elemental portions are located in spaced relation to each other. However, all elemental portions are contiguously positioned to each other with boundary surfaces thereof in registered contact. Such a construction and positioning of the individual elemental portions permits an arrangement of them upon the support which simulates the pattern of a photographic color screen.

To carry out this concept, the light-sensitive elemental portions of at least one of the sets of light-sensitive elemental portions are located on elevated sections of a relief impression which has spaced-apart elevated sections with depressed sections interspersed therebetween while the inlaid light-sensitive portions of at least one set of light-sensitive elemental portions are contained in the depressed sections that are provided in the relief impression. By this arrangement, the light-sensitive portions of different sets of light-sensitive elemental portions may be located on the support in side-by-side and contiguous or contacting relation.

It is further possible in a structure of this nature to utilize a calendering operation after the application of all light-sensitive elemental portions to the support whereby to locate the outer faces of all light-sensitive elemental portions substantially in the same plane by flattening those light-sensitive portions which may be higher than other light-sensitive portions.

Each light-sensitive elemental portion may comprise a single layer formed of a mixture of photosensitive silver halide and all of the materials which assist in image formation. Preferably, however, each light-sensitive elemental portion comprises a composite layer formed of a plurality of strata which are piled or superposed one on the other and each of which contains photosensitive silver halide and/or a material which assists or contributes to image formation or the control thereof.

A number of advantages arise by the use of the composite type of light-sensitive elemental portion which comprises two or more superposed strata. For example, a yellow or other type of filter may be located on the exposure side or in front of or over a silver halide emulsion stratum where such filter is desirable for the purpose of limiting exposure of the emulsion to light of predetermined wavelengths. Also, various materials and reagents, including a color-providing substance, may be located in front of or behind the emulsion stratum to the end of avoiding emulsion desensitization. Likewise, the composite type of light-sensitive elemental portion permits the location of processing materials back of the emulsion stratum which favors processing control, as well as the separation, in each submacroscopic element, of different materials related to one another and essential to each element.

In utilizing a photosensitive element made up of two or more sets of light-sensitive elemental portions, it is essential that the individual elemental portions be in registered side-by-side relation to each other so that there is no sidewise overlap between them. The registration of the individual light-sensitive elemental portions becomes inherently assured by the practice wherein at least one set of light-sensitive elemental portions is mounted on elevated sections formed on a support in spaced relation to each other and wherein at least one other set of light-sensitive elemental portions is inlaid in depressions in the support located between elevated sections. This assurance of inherent registration is of extreme importance when each light-sensitive elemental portion is of the composite type having superposed strata, the assured registration attaining added significance inasmuch as it inherently registers the individual strata which make up each composite submacroscopic elemental portion. Although the prior art teaches a variety of structures and processes of producing the same wherein a number of different photographic materials, such as filters, sensitizers and color formers, are associated or mixed together in minute particles and the particles distributed on or in a light-sensitive emulsion, the feature of the present invention of assured registration makes it possible to provide submacroscopic elemental portions, each including a light-sensitive silver halide, together with one or more other materials disposed in different strata located in registered overlying relation.

A photosensitive element of the general character described is shown in FIG. 1 as comprising a support 40 having thereon three sets of submacroscopic light-sensitive elemental portions in which the light-sensitive portions individual to each set of light-sensitive elemental portions are respectively indicated by the reference characters 100, 200 and 300. The individual light-sensitive elemental portions 100 are illustrated in spaced relation to each other and with the light-sensitive portions 200 and 300 interspersed therebetween in inlaid relation.

In FIG. 1, the screen pattern is made up of elemental portions which are of rectangular shape and which are substantially uniformly distributed over the support and are arranged to provide said pattern. However, the invention contemplates the use of light-sensitive portions of other shapes as well as different pattern layouts or arrangements. Dimensions of the light-sensitive elemental portions have been greatly exaggerated in the drawings for the purpose of illustration, the term "submacroscopic" being employed herein to mean of a size such that while the elemental portions are visible in aggregate to the unaided eye, individual elemental portions cannot be resolved.

Each light-sensitive portion 100, 200 or 300 is shown in FIG. 1 as formed of a single layer of material which constitutes a stratum containing at least silver halide of the characteristics needed to render the different elemental portions selectively exposable, or an exposure-controlling material capable of performing the same function. The processing steps set forth herein for the production of a photosensitive element such as that illustrated in FIG. 1 first lead to the formation of an element having two sets of light-sensitive elemental portions. One or more additional sets of light-sensitive elemental portions may be provided on the film support by extending the processing procedure beyond the stage just indicated. Such an extension of production processing steps is employed to produce the photosensitive element of FIG. 1 which is especially suited for carrying out color photography and as such is illustrated as being provided with light-sensitive elemental portions 100, 200 and 300 respectively representative of the blue-sensitive, the green-sensitive and the red-sensitive components of three-color film.

In addition to the photosensitive silver halide, it is desirable, in certain embodiments of the invention, to utilize light-sensitive elemental portions for at least one set of light-sensitive portions of a nature comprising two or more strata including one or more photographic materials which are of a substantially insensitive character and which contribute to image formation, including exposure and processing controls. As previously mentioned, a light-sensitive elemental portion is preferably in the form of a composite layer having two or more superposed strata, one of which comprises silver halide and any other one of which comprises one or more of the just-mentioned insensitive photographic materials. Also, as noted, the inventive concept includes the formation of a light-sensitive elemental portion as a mixture of these insensitve photographic materials in a silver halide emulsion.

By the expression "insensitive photographic materials," there is meant exposure-controlling materials, such as filters and sensitizers, for rendering the elemental portions differentially exposable; color-providing substances utilized to produce a positive image in terms of dyes; insulating materials in the form of plastics which are difficultly penetrable by an aqueous alkaline liquid; and certain silver halide transfer agents or solvent fixers.

The expression "exposure-controlling material" as used herein, is intended to cover all materials employed for sensitizing silver halide emulsions or for controlling or limiting the exposure of a silver halide to light of a predetermined wavelength or range of wavelengths. Specifically, it is intended to cover optical sensitizers such as dyes which limit the sensitivity of an emulsion to a specific range of wavelengths or impart to the emulsion a sensitivity having a peak within the specified range; as well as filter media which may be provided between the emulsion and the source of actinic light or in the emulsion itself, this latter group including dyes, pigments and colloidal silver. Such exposure-controlling materials may be provided alone or in combinations intended to impart to the emulsion a controlled exposability and/or specified resultant sensitivity in the visible or nonvisible wavelength ranges, or a peak sensitivity or exposability to a specified wavelength or range of wavelengths which is substantially different from the resultant sensitivity or exposability of a silver halide unaffected by the exposure-controlling material or associated with a different exposure-controlling material.

The expression "color-providing substances," as used herein, is intended to include all types of substances or reagents which may be utilized to produce a positive image in terms of a dye. The chromophoric system imparting the desired colored properties to the positive image dye may be initially contained in such color-providing substance or such chromophoric system may be formed as a result of a reaction after transfer, such as oxidation and/or coupling. These color-providing substances may comprise dyes or intermediates for dyes and are not necessarily of the same color as the image dye to be produced, and may be of a different color or a neutral hue. Such color-providing substances do not form part of the inventive subject matter of this application and therefore are not given in detail. For purposes of illustration, however, mention may be made of the following types of color-providing substances which may be utilized in employing inventive concepts of this invention:

(1) Color formers or couplers which react with the oxidation product of color developers to produce a dye; see for example the following patents issued to Edwin H. Land: 2,559,643, issued July 10, 1951, 2,661,293, issued December 1, 1953, 2,698,244, issued December 28, 1954, and 2,698,798, issued January 4, 1955.

(2) Self-coupling developers, e.g., a silver halide developing agent capable of coupling with itself, when oxidized, to form a dye; see for example the above-mentioned Patent No. 2,698,244.

(3) Dye developers, that is, complete dyes which possess a silver halide developing function; see for example the copending application of Howard G. Rogers, Serial No. 415,073, filed March 9, 1954, now abandoned and replaced by Ser. No. 748,421, filed July 14, 1958 (now U.S. Patent 2,983,606 issued May 9, 1961).

(4) Leuco dyes, that is, dyes utilized in their leuco or reduced form and which possess a silver halide developing function but which must be oxidized after transfer to the image-receiving material; see for example Patent No. 2,909,430 to Howard G. Rogers, issued October 20, 1959.

(5) Coupling dyes, i.e., a complete dye which is capable of coupling with the oxidation product of a color developer, e.g., diethyl para-phenylenediamine, to form an immobile dye; see for example the copending application of Howard G. Rogers, Serial No. 358,012, filed May 28, 1953, now U.S. Patent 2,774,668 granted December 18, 1956.

One practice for providing a photosensitive element of the character with which this invention is concerned is to coat over a surface of a support, or to otherwise apply thereto, a layer which is indicated in general by the reference numeral 10 and which contains at least the photosensitive material needed in the formation of the first set of light-sensitive elemental portions 100. The layer 10 is one stratum thick if the light-sensitive portions 100 comprise silver halide or a mixture of silver halide and various photographic materials provided by incorporating the photographic materials in a silver halide emulsion. On the other hand, layer 10 is preferably a composite type of layer comprising two or more superposed strata such as the stratum 12, containing nonphotosensitive materials used in the photographic process, and the stratum 11, containing silver halide, in instances when the light-sensitive portions are intended to include photographic materials in addition to silver halide. In the illustrated embodiment this composite layer is formed by first covering or coating the surface of the support with the material needed to provide the stratum 12 and then applying over this stratum the photosensitive material which provides the stratum 11.

The next step in the production of the photosensitive element is to provide a relief impression in the light-sensitive layer 10 and the support 40. This is accomplished by running the partially completed photosensitive element between an embossing roll pair comprising an embossing roll having at least a part of the final screen pattern formed in relief upon the periphery thereof and a smooth-surfaced roll in superposed relation to the embossing roll. Both rolls are heated and are arranged to exert pressure upon opposite sides of the partially completed photosensitive element which is passed therebetween with the light-sensitive layer 10 in contact with the surface of the embossing roll.

For producing the screen pattern illustrated in the drawings, the embossing roll is of a generally corrugated nature, that is to say, its surface is composed of spaced-apart elevated sections which are joined by depressed sections with the direction of the corrugations and the elevated sections extending axially of the roll surface. However, the elevated sections and corresponding depressed sections therebetween may be helically arranged at a 45° angle over the roll surface. In general, this latter arrangement is preferred for reasons which will hereinafter appear. The relief impression formed upon the surface of the embossing roll is arranged to provide a succession of elevated and depressed sections of about one hundred fifty to two hundred fifty to the inch, each of these sections possessing a similar width dimension. In depth, each depressed section in the relief formed on the roll surface may be from .0005 inch to .0015 inch or greater.

Figure 2A:
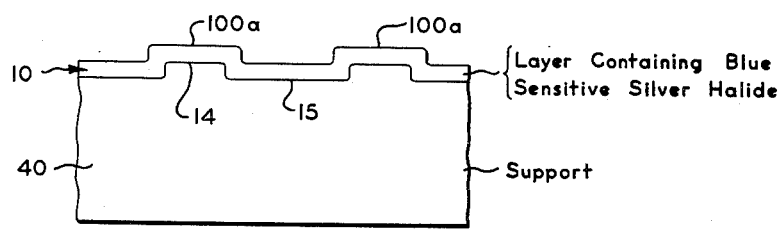
FIGS. 2a, 2b and 2c are broken-away elevations of the photosensitive element of FIG. 1 taken, respectively, from a side and the opposite ends thereof and illustrating the appearance of the photosensitive element at one stage in the manufacture thereof.
Figure 2B:
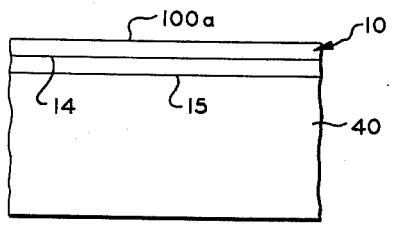
Figure 2C:
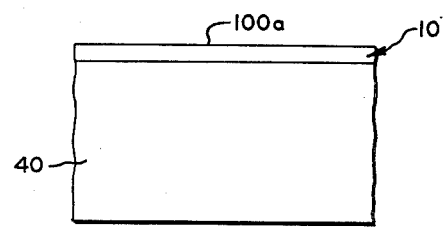

FIGS. 2a, 2b and 2c schematically show a photosensitive element like that of the completed element illustrated in FIG. 1 but in the production stage following the just-described embossing step after the application of the layer 10 to the support. In this regard, FIGS. 2a, 2b and 2c are broken-away elevations of the photosensitive element at this stage of production taken respectively from a side and from the opposite ends of the incomplete element at this stage. These views show the reproduction, in the support 40 and the layer 10, of the corrugated type of relief formed on the embossing roll to provide spaced-apart elevated sections 14 extending transversely of the support 40 and joined by depressed sections 15 which are interspersed therebetween. The layer 10 is of substantially uniform thickness and, while still providing an overall covering of the support 40, has parts thereof pressed into the depressed sections 15 provided by the relief impression. Those parts 100a of layer 10 which cover the elevated portions 14 of the support may be used in full to provide the light-sensitive elemental portions of a finished photosensitive element having two sets of differently sensitive components but have only parts thereof employed to provide light-sensitive elemental portions in a photosensitive element having three or more sets of light-sensitive elemental portions.

Figure 2D:
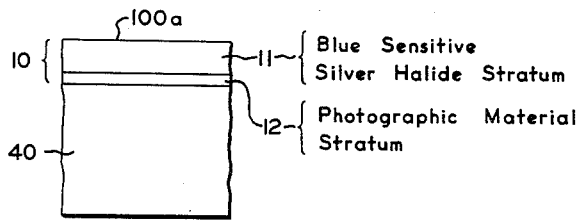
FIG. 2d is a broken-away elevation, similar to FIG. 2a, of a photosensitive element, detailing a composite layer containing photosensitive material and providing a light-sensitive elemental portion.

FIG. 2d shows by enlargement a part of the support as illustrated in FIG. 2a and details by broken-away elevation a part of an elevated section 14 of the support including a light-sensitive covering 100a in the form of a composite layer having strata 11 and 12. The inherent registration of the strata 11 and 12, when the composite type of layer is formed, will be self-evident.

The next step in the production of the photosensitive element is to form the second set of light-sensitive elemental portions on the support 40. It may be observed, with reference to FIG. 2a, that the partially completed photosensitive element mounts a light-sensitive structure, which comprises the layer 10, on the surface of the support 40 having the relief impression therein. This light-sensitive structure provided by the layer 10 has parts 100a which are in spaced relation to each other and are elevated with respect to other parts whereby there is provided in the light-sensitive structure a series of cavities of which each cavity is located between a pair of adjacent elevated parts of the structure. These cavities result from the fact that each depressed section 15 of the support 40 is not entirely filled by the part of the layer 10 which is pressed into it as a result of the embossing step.

Figure 3A:
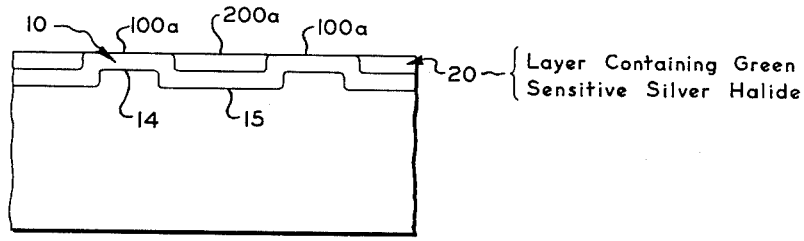
FIG. 3a is a broken-away elevation, similar to FIG. 2a, illustrating the element of FIG. 2a to a further stage in the manufacture thereof.

Means are provided by the just-mentioned cavities for permitting the individual light-sensitive portions 200a of a second set of light-sensitive portions to be inlaid or seated in appropriate registration in the body of the support. To this end, a layer 20 containing at least the appropriate photosensitive material for the light-sensitive portions 200a is inlaid into each cavity by conventional doctoring techniques. By this procedure, each layer 20 is seated on a part of a layer 10 which covers a depressed section 15 of the support 40, as it is shown in FIG. 3a which is a side elevation of the photosensitive element after the light-sensitive portions 200a have been inlaid. In this regard, the portion of a layer 10 on which a layer 20 is seated acts as a support base for the layer 20 and, as will appear, is not intended to otherwise operate or function in the photographic process.

Figure 3B:
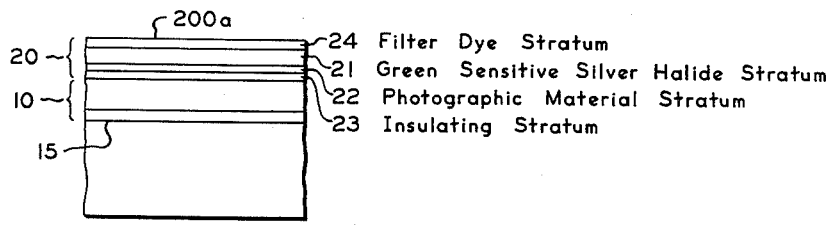
FIG. 3b is a broken-away elevation, similar to FIG. 2d, illustrating a section of the photosensitive element of FIG. 3a when provided with a composite layer providing a light-sensitive elemental portion.

FIG. 3a illustrates light-sensitive portions 200a each comprising a layer 20 which is one stratum thick, while FIG. 3b shows, by enlargement, a part of the support illustrated in FIG. 3a and details, by broken-away elevation, a depressed section 15 of the support which is partially filled with the light-sensitive layer 10 and which includes a composite type of layer 20 comprising a plurality of superposed strata.

In FIG. 3b, the stratum 23 of the composite layer is formed of insulating material and functions to at least retard penetration of an alkaline processing liquid into the light-sensitive layer 10 for reasons which will presently appear. Stratum 22 is adapted to contain insensitive photographic processing materials while stratum 21 is a suitably sensitive emulsion which, for three-color work, will be the green-sensitive emulsion, while stratum 24 contains a filter dye. In forming the composite layer 20, the individual strata thereof are successively doctored into the cavities formed in the light-sensitive structure provided by the embossed layer. It will be self-evident that the just-described procedure will inherently result in registration of the various strata of the composite layer.

In doctoring the material forming a layer or a stratum into a depressed section of a light-sensitive structure carried on the support of the photosensitive element, it is preferable, from the standpoint of obtaining layers or strata of a uniform desired thickness, to effect the relative movement of the doctor blade over the support and across the depressed sections thereof at an angle of 45° to said depressed sections. For continuous production, it is therefore desirable to utilize an embossing roll so designed that it forms the depressed and elevated sections on the support in a direction at 45° to the longitudinal axis of the support whereby the doctoring of the material which forms a layer or stratum may be carried out by relative movement between the sheet support and the doctor blade and so that the doctor blade contacts the support at a right angle to its longitudinal axis.

The inlaying of the individual layers 20 results in providing a light-sensitive structure on the support 40 which is comprised of a set of light-sensitive elemental portions 200a which are interspersed between the light-sensitive portions 100a. The light-sensitive portions 200a are formed of layers which are at least sufficiently thick so that the outer surface of each light-sensitive portion 200a lies in or close to a plane containing the outer surfaces of the light-sensitive portions 100a. Thus, the individual light-sensitive elemental portions of the photosensitive element are selectively exposable by light directed onto their outer faces. When the final product is a photosensitive element having two sets of differently sensitive elemental portions, the light-sensitive portions 100a and 200a are used in their entirety. On the other hand, where production processing is extended to provide a third set of light-sensitive elemental portions, only parts of the light-sensitive portions 100a and 200a are employed for this purpose, as will presently appear.

While for three-color photography the light-sensitive elemental portions so far described preferably provide the blue-sensitive and the green-sensitive components of the photosensitive element, it will be appreciated that light-sensitive elemental portions of other sensitivities may be utilized. Thus, for a finished photosensitive element possessing only two different sets of light-sensitive elemental portions, color sensitivities other than those described are generally desirable. For example, the light-sensitive portions 100a would preferably provide red-sensitive components while the light-sensitive portions 200a would preferably provide the green-sensitive components for a photosensitive element having two sets of differently sensitized elemental portions.

By an extension of the production processing, a third set of light-sensitive elemental portions may be mounted upon the support 40. In this regard, the support and the light-sensitive structure provided thereon by the light-sensitive portions 100a and 200a have a relief impression formed therein by embossing practices similar to those heretofore described. It may be noted, with reference to the particular screen pattern which has been illustrated, that the light-sensitive portions 100a and 200a are in the form of lines or stripes which extend across the partially completed photosensitive element, as, for example, transversely thereof. With this type of pattern, it is preferable to locate the third set of light-sensitive portions at right angles to the direction of the light-sensitive portions 100a and 200a, for example, so that they will extend longitudinally of the support. This practice may be carried out with an embossing roll having a corrugated surface such as that generally described but with directions of the corrugations running circumferentially around the roll instead of transversely of its periphery. When the first embossing step is carried out with an embossing roll having helically arranged elevated and depressed sections, the second embossing step is carried out with a similar roll but with the helix angle preferably at 90° to that of the first-mentioned roll. However, for the purpose of simplifying the drawings, the photosensitive element of FIG. 1 has been shown as formed with the aid of a first embossing roll of the character having the elevated and depressed sections thereof extending axially of the roll surface and by the use of a second embossing roll wherein the elevated and depressed sections extend circumferentially of the roll.

Figure 4A:
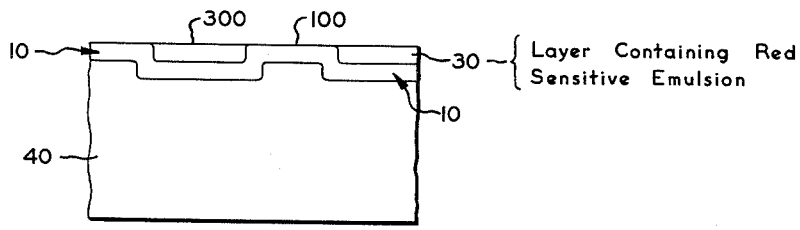
FIG. 4a is a broken-away end elevation, similar to FIG. 2c, showing the appearance of the photosensitive element upon its completion.

The second embossing step, as shown in FIG. 4a, provides in the already formed light-sensitive structure a series of spaced-apart depressed sections which will extend into and across the already formed light-sensitive portions 100a and 200a. The depressed sections formed by the second embossing step will be interspersed between elevated sections formed of undisturbed surface parts of the light-sensitive portions 100a and 200a. It will be apparent that a second embossing of this character divides each already formed light-sensitive portion into a plurality of small sections each of which, as shown in FIG. 1, provides the individual light-sensitive elemental portions 100 and 200 for a finished product having three sets of light-sensitive elemental portions.

The depressed sections formed in the light-sensitive structure as a result of the second embossing step permit the individual light-sensitive portions 300 of the third set of light-sensitive portions to be seated in the body of the structure and to be inlaid in the support in appropriate registration. A layer 30 containing at least the appropriate photosensitive material is inlaid into each cavity by doctoring techniques in the manner already described. However, in this instance, each layer 30 is seated on a part of a layer 10 which covers a depressed section 15 of the supoprt 40 or upon a part of a layer 20 which is superposed on a layer 10. Such a structure is shown in FIG. 4a which is an elevation from the end of the photosensitive element at the right of FIG. 1 after the second embossing step and the inlaying of the light-sensitive elemental portions 300. In this regard, the portion of any layer 10 or 20 upon which a layer 30 is seated acts as a support base for the layer 30 and, as will appear, is not intended to otherwise operate or function in the photographic processing.

Figure 4B:
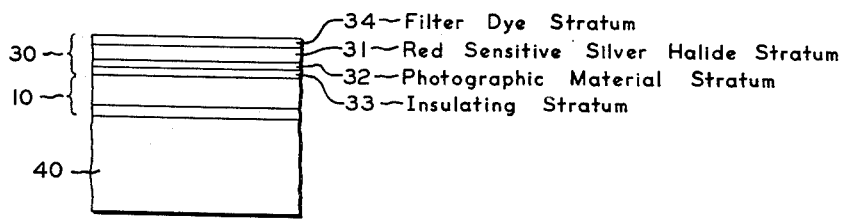
FIG. 4b is a view similar to FIGS. 2d and 3b and shows a composite type of light-sensitive elemental portion.

FIG. 4a illustrates light-sensitive elemental portions 300 as comprising a layer 30 which is one stratum thick, while FIG. 4b shows, by enlargement, a part of the support illustrated in FIG. 4a and details, by broken-away elevation, a depressed section of the support which is partially filled with the light-sensitive layer 10 and which includes a composite type of layer 30 seated therein. The doctoring practices heretofore described will inherently and appropriately register the material for forming a layer 30 which is one stratum thick or the materials for forming a composite type of layer.

The strata of FIG. 4b are similar to those described in connection with FIG. 3b and, in this regard, comprise a stratum 33 of insulating material, stratum 32 containing insensitive photographic processing materials, a stratum 34 containing a filter dye and a stratum 31 containing a suitably sensitive silver halide emulsion which, in this instance, will be a red-sensitive emulsion.

The light-sensitive elemental portions 300 are formed of layers which are at least sufficiently thick so that the outer surface of each such portion 300 lies in or close to a plane containing the outer surfaces of the light-sensitive elemental portions 100 and 200. If desired, any surface irregularities in the photosensitive element may be removed by a flattening step carried out by running the photosensitive element with the three sets of light-sensitive elemental portions between suitable calendering rolls which may or may not be heated.

In carrying out color photography, it may be desirable that the sum of the surface areas of the light-sensitive elemental portions of one set of elemental portions be equal to that for each other set of light-sensitive elemental portions. In this regard, a practice of this nature is illustrated throughout the drawings. It may be again pointed out that the dimensions of the light-sensitive elemental portions have been greatly exaggerated for the purpose of illustration. As will be set forth in more detail, the width of the individual elemental portions will be from about .002 inch to .004 inch or less.

Other practices for producing the photosensitive element fall within the scope of the invention. In this regard, it is possible to form the first set of light-sensitive elemental portions on a support 40 by a procedure which involves forming a relief impression in the support and substantially simultaneously applying to each elevated section of the relief a stratum of a material which provides at least a component of each of the light-sensitive elemental portions of the first set.

Such procedure is carried out with a viscous liquid which comprises a solvent for the support and in which there is dissolved the material adapted to provide at least a component of the light-sensitive elemental portions of the first set. This liquid is applied over one surface of the support whereby to soften the support and permit a relief impression to be formed in said surface by pressing a relief pattern engraved on a rotatable drum into the softened surface of the support while moving the drum and the support together for a part of one revolution of the drum and then stripping the support from the drum. As a part of the support is pressed against an elevated section of the relief on the drum, viscous liquid which covered that part of the support is forced onto an adjoining part of the support which is pressed into a depressed section of the relief impression on the drum to provide a coating of the liquid thereon. This coating, which is viscous and contains volatile solvent matter, dries very quickly to leave the desired stratum on the top of each elevated section of the relief impression formed in the support.

One apparatus for carrying out processing of the nature just described is shown in FIG. 5 as comprising a rotatable drum 50 having a relief pattern engraved on the surface thereof, a pair of pressure-applying rolls 51, 52 which are each of a width at least equal to the width of the drum 50 and are urged into contact with the drum and which are respectively located on opposite sides of the axis of rotation of the drum. A liquid supply 53, including feed means for distributing the liquid across the drum, is also a part of the apparatus. A film support, such as the support 40, which is carried by a stock roll (not shown) is passed between the drum 50 and the pressure roll 51, then partially around the drum and under pressure roll 52 from whence it is drawn from contact with the drum by means not illustrated. Directional movement of the support 40 and the rotation of drum 50 are indicated by arrows in FIG. 5. Liquid composition from supply source 53 is distributed by conventional feed means generally uniformly across the surface of the drum adjacent the location where the support 40 is pressed into contact with the drum by the pressure roll 51, such liquid being indicated by the reference numeral 54.

As the support sheet 40 is drawn away from the drum, it will be found that the sheet has been impressed with a relief pattern which, as shown in FIG. 6a, comprises spaced-apart elevated sections 114 between which depressed sections 115 are interspersed. Additionally, a stratum of the material carried in the liquid 54 is coated upon the tops of the elevated sections of the relief impression, as indicated by the reference character 112. Thus, for example, the stratum 112 may include photographic processing materials of the nature incorporated in the stratum 12 of FIG. 2.

The relief impression formed in the support by the apparatus and practices described in connection with FIG. 5 is illustrated in FIG. 6a as being similar to the relief impression shown in FIG. 2a and is made with a drum having a pattern of a corrugated type. In this instance, for a reason which will presently appear, the width of the elevated sections engraved on the drum will be somewhat greater than the engraved depressed sections whereby the depressed sections 115 of the relief formed in the support 40 will be somewhat wider than the elevated sections 114 of this relief.

The first set of light-sensitive elemental portions for the photosensitive element in FIG. 6a is now completed by coating a stratum 111 of a suitably sensitive silver halide emulsion, for example a blue-sensitive emulsion, over the surface of the support having the relief impression therein. Coating is carried out by conventional methods from a tray to apply a wet emulsion coat on the surface of the support having a thickness sufficient to entirely cover both the depressed sections 115 and the elevated sections 114. The solid content of the emulsion and the thickness of the wet coat are controlled so that the layer when dry will be reduced to a substantially uniform thickness such as that illustrated in FIG. 6b wherein the depressed portions 115 of the relief impression are partially filled with the emulsion stratum 111 to leave cavities therein similar to those discussed in connection with FIGS. 2a and 3a and permit a second layer containing at least photosensitive silver halide to be doctored therein, in the manner previously described, to the end of providing a second set of elemental portions. The third set of light-sensitive elemental portions, in this embodiment of the invention, is added by using the embossing and doctoring techniques heretofore described.

It will be appreciated that the practices described in connection with FIGS. 5, 6a and 6b, as well as modifications thereof, will permit the inherent registration of the individual light-sensitive elemental portions whether these elemental portions comprise a layer one stratum thick or are of the composite type comprising two or more superposed strata.

By another production variation, a relief impression, formed of a set of spaced-apart elevated sections with depressed sections therebetween, may first be formed in a support before the application on the support of the material for the first set of light-sensitive elemental portions. The procedure described in connection with FIGS. 5, 6a and 6b is adapted for providing a support with a preformed relief impression therein. For this purpose, the liquid composition applied onto the support to soften and/or swell the support will comprise a solvent for the support and, if the action of the solvent is both rapid and powerful, will include a substance for controlling the solvent action to restrain excessive softening or dissolution of the support.

In this connection, a plastic support, such for example as cellulose acetate, may be provided with a relief impression therein by using the apparatus described in connection with FIG. 5 and applying to the support a liquid comprising a solvent for the support and cellulose acetate as a control substance. A suitable solvent in this instance comprises a mixture of acetone and methanol or a mixture of ethyl acetate and methanol to either of which mixtures cellulose acetate is added. When this practice is followed, the tops of the elevated sections will be coated with a stratum of clear cellulose acetate rather than with the photographic processing material heretofore described.

Where a support is employed having a preformed relief impression consisting of a set of elevated sections and a set of depressed sections, the material for the first set of elemental portions is coated onto the tops of the elevated sections of the relief. A second set of elemental portions is provided by doctoring the material therefor in the depressed sections in the support. If a third set of elemental portions is to be mounted, embossing practices like those described are carried out to provide a second set of depressed sections for the relief and the material for the third set of elemental portions is doctored into the last-mentioned depressed sections. In this embodiment, the first and second sets of light-sensitive elemental portions are mounted or carried directly on the surface of the support. The elemental portions of the third set may also be mounted directly on the support surface if material which provides the first and second elemental portions is removed from the second set of depressed sections.

Alternatively and preferably, three sets of light-sensitive elemental portions may be mounted directly on the support surface by procedures wherein the material for each of the first and second sets of light-sensitive elemental portions is placed upon the elevated sections and within the depressed sections of a support which is provided with a preformed relief impression, all in a manner similar to that described just above. The support, with two sets of light-sensitive elemental portions thereon, is then embossed to provide a second set of depressed sections. In forming this second relief impression, parts of the already mounted elemental portions are pressed into the second set of depressions, while parts of the material which have been coated onto the elevated sections of the first formed relief will remain thereon. The third set of light-sensitive elemental portions is provided upon the support by removing, as by scraping, the material which remains on any elevated section thereof following the formation of the second relief impression and by replacing this removed material with the material desired for the third set of light-sensitive elemental portions. If desired, the support may then be calendered in the manner previously set forth.

In instances such as this where all elemental portions are mounted or carried directly on the surface of the support, calendering of the photosensitive element after all elemental portions have been mounted thereon may be carried out so as to flatten the elevated sections and raise the depressed sections of the support to an extent where the support surface is substantially uniplanar whereby the bottoms of all elemental portions will be located in substantially the same plane. By this procedure, the differently sensitized elemental portions, while being located in inlaid relation to each other, will not be recessed or inlaid in the support body itself as in the case of photosensitive elements made in accordance with the previously described procedures or wherein at least one stratum of the first-formed set of elemental portions is coated over the support surface and a relief impression is then formed or wherein the depressed sections of a support have the materials which individually provide two different light-sensitive elemental portions superposed on each other but separated by an insulating stratum.

As a further alternative, a support having a preformed relief impression thereon may be coated all over with a composition containing the insensitive photographic materials to a thickness sufficient to entirely cover both the depressed sections and elevated sections thereof. The solid content of this composition and the thickness thereof are controlled so that the applied coating, when dry, will be reduced to a thickness such as that desired for a photographic materials stratum. Following this procedure, a wet emulsion coat is applied over the photographic materials stratum in a manner like that described in connection with FIGS. 6a and 6b to provide the desired photosensitive stratum.

Still another production method and product thereof are comprehended by the invention, wherein support 40 is provided with two sets of light-sensitive elemental portions by any of the methods hereinbefore described. These two sets of elemental portions include a silver halide emulsion, sensitized preferably for the primaries red and green, and include appropriate color-providing substances either mixed with the emulsion or on separate layers superposed therewith. The entire surface of the photosensitive element, that is, the surfaces of both sets of elemental portions, are then coated with a layer or stratum containing a filter dye, preferably yellow, a second relief impression is formed in the element and a blue-sensitive silver halide emulsion, together with an appropriate color-providing substance, is doctored into the depressed sections of this impression to provide a third set of elemental portions. By this method a photosensitive element is produced having sets of red- and green-sensitive elemental portions, each covered by a registered superposed yellow filter for absorbing blue light, and a third set of blue-sensitive elemental portions, the three sets of elemental portions preferably including, in the order named, color-providing substances for cyan, magenta and yellow dyes.

Still a further method, advantageous in that no embossing operations are performed on the emulsion itself and most of the operations may be performed in the light, is comprehended by the invention. In this method support 40 is provided by any of the methods described with a screenlike arrangement of two sets of elemental portions. The elemental portions of each of these sets comprise a sensitizer for a silver halide emulsion and an appropriate color-providing substance; for example, the elemental portions of one set preferably include a sensitizer for red light and a color-providing substance for cyan, while the elemental portions of the second set comprise a sensitizer for green light and a color-providing substance for magenta. The sensitizers are of the type which will diffuse from one stratum into a portion of a silver halide emulsion layer superposed therewith and thereby sensitize that portion of the silver halide emulsion. An insulating stratum is provided under the second set of elemental portions to separate the red and green sensitizers and prevent diffusion of the red sensitizer into the green-sensitive elemental portions. A third relief impression is then formed in the manner described and a layer containing a color-proving substance, preferably for yellow, is doctored into the depressed sections to form a third set of elemental portions. The composition and consistency of this last layer is controlled so that it shrinks on drying and at least slight depressions remain corresponding to the second relief impression. An insulating stratum is provided under the layer containing the color-providing substance for yellow to prevent diffusion of the red and/or green sensitizers therethrough. A layer comprising a photosensitive emulsion is then coated over the three sets of elemental portions to substantially a uniform depth so that the relief impression remains. The portions of the emulsion overlying the elemental portions including the red and green sensitizers are sensitized, respectively, for red and green light, while the portion of the emulsion overlying the third set of elemental portions remains substantially sensitive to blue light.

Another layer containing a filter dye may then be printed onto the elevated sections of the element, i.e., onto the red- and green-sensitive portions of the emulsion, after which the element may, if desired, be subjected to a calendering operation. It is apparent from the foregoing that the emulsion comprising the photosensitive element produced by this method need not be subjected to an embossing operation which may result in desensitization thereof, and that all but the steps of applying the emulsion and the filter layer may be performed in the presence of light. An alignment or registration of appropriate sensitizers, color-providing substances and filters is automatically achieved.

With reference to the materials useful in the formation of the photosensitive elements of this invention, it is to be observed that a wide selection of support materials is available. Organic plastics, particularly those conventionally employed as film base materials, are preferred for the support. The organic plastics possess the ability to have one or more relief impressions formed therein by the practices heretofore described which involve the use of heat and/or pressure or a solvent for the support and the use of pressure. Additionally, plastics may be molded or cast into a preformed support provided with a relief impression therein. Plastic materials may be selected which, with the exception of solvents and swelling agents used to form a relief impression, are at least difficulty permeable to and substantially insoluble in all liquids used in the production of the photosensitive element and its photographic processing whereby each relief impression provided therein is substantially maintainable in its formed shape. Furthermore, plastics possessing the desired properties described are available in sheet form for roll film purposes or in thicknesses needed to provide the general rigidity of a conventional photographic plate.

Another material which may be employed for the support is glass, at least under circumstances wherein the support is to carry only two sets of light-sensitive elemental portions, and a relief impression is preformed therein prior to applictaion of the light-sensitive elemental portions thereon. Paper may also be used as a support material, although it is not as preferred because of its permeability to liquids. However, the versatility of plastic materials for use as a support structure is well illustrated in connection with paper by mentioning that a composite structure comprising a paper base having a plastic coating thereon is satisfactory for support purposes.

As specific examples of preferred plastic materials for the support, mention may be made of cellulose acetate, cellulose acetate butyrate and nylon type plastics. Cellulose nitrate may also be employed for the support material but is not as desirable as the plastics heretofore mentioned because of its tendency to oxidize a silver halide developer carried in a stratum in contact with the support whereby such a stratum must be protected or insulated from the support.

Generally speaking, a support or film base suitable for roll film is from .003 to .005 inch thick. For a rigid support, a considerably greater thickness will, of course, be required.

Conventional silver halide emulsions are intended for use with the invention. The particular sensitivity range of each photosensitive emulsion will be chosen to meet the particular requirement of use to which the completed photosensitive element will be put. In the case of a photosensitive element being used for three-color reprocduction, as hertofore noted, a blue-sensitive emulsion, a green-sensitive emulsion and a red-sensitive emulsion are used. These, as previously pointed out, are either coated on the support over an already applied photographic materails stratum or are doctored into the depressed sections of a relief impression. For color work, the blue-sensitive stratum 11, i.e., the photosensitive stratum first mentioned on the support, regardless of sensitivity, will have a thickness of from about .0002 to .0005 inch, while the green- and red-sensitive strata are each roughly about .0002 inch or slightly thicker.

In the photosensitive elements illustrated herein, it has been pointed out that the light-sensitive elemental portions seated in the depressed sections of a relief impression are supported upon layers 10 and 20 containing the ingredients needed to provide light-sensitive elemental portions of other sensitivities. There is a tendency for liquid which is used to process a photosensitive element and which has penetrated or permeated through an overlying light-sensitive elemental portion into an underlying layer to transport image-forming materials from the underlying layer to the overlying light-sensitive elemental portion, as well as to transport such image-forming materials to a positive element when the photosensitive element is used to carry out a one-step transfer process. This condition is undesirable since the image-forming components transported from the underlying layer can lead to errors in color rendition.

Penetration of a liquid processing composition into the photosensitive element is controllable by a number of practices. For example, penetration control may be effected by the thickness of each silver halide emulsion or photosensitive layer forming the different light-sensitive elemental portions, as well as by the selection of emulsions which are of themselves difficult to penetrate, or by a combination of both of these practices. Additionally, increase of thickness of a photographic emulsion due to its swelling when wetted with processing composition may be utilized as a control means. Furthermore, various materials may be added to a photosensitive layer to retard its permeability, such as gum arabic, polyvinyl alcohol and other materials which are compatible with gelatin.

A convenient penetration control may be provided by the use of insulating strata which are located between superposed emulsions but not over portions of an emulsion which remain uncovered by any other emulsion. The insulating material should be at least difficultly penetrable and substantially inert to liquid processing compositions, including alkali dissolved therein. Preferably, the insulating material should display at least slight adhesion to gelatin and materials coated upon its surface. Examples of such materials are cellulose nitrate, cellulose acetate, cellulose butyrate, partially hydrolyzed polyvinyl acetate, nylon type plastics and the like.

Compositions for providing an insulating stratum such as the strata 23 and 33 comprise from ten to twenty grams of the particular plastic in a suitable organic solvent. A specific composition for providing an insulating material which may be doctored into a depressed section of a relief comprises a solution of 20 grams of cellulose nitrate in 100 cc. of ethyl acetate or other organic solvent. The insulating composition is doctored into a depressed section of a relief impression to provide a stratum 23 or 33 therein having a thickness of the order of from .0001 to .0002 inch. After the insulating stratum 23 or 33, as the case may be, has dried, the stratum of photosensitive emulsion 21 or 31 is then applied over it by the doctoring practices heretofore set forth.

It is desirable in certain instances to associate light-filtering media with each light-sensitive elemental portion of at least one of the sets of light-sensitive elemental portions for controlling the exposure thereof. For example, in three-color photography, it is desirable to expose the green-sensitive and the red-sensitive light-sensitive elemental portions through a blue-absorbing or yellow filter to the end of obtaining faithful color reproduction inasmuch as both the green-sensitive and red-sensitive emulsions will be sensitive also to blue light. In this regard, each light-sensitive elemental portion 200 and 300 has been shown as provided with a light-filtering stratum 24 and 34 respectively.

In regard to the use of filter media in film constructions of the character illustrated herein, one feature should be particularly observed, namely, the ability to associate filter media with a light-sensitive portion which will modify the exposure light for that light-sensitive portion but will have substantially no effect on the exposure light for light-sensitive elemental portions with which that particular filter media is unassociated. Another feature resides in the insolubility of the filter material in alkaline solution whereby it will remain in the photosensitive element so that no precautions need be taken to prevent its undesired transfer and deposit on a print-receiving element in carrying out a transfer process.

All of the photosensitive elements shown herein are suitable for carrying out multicolor photography, particularly a one-step photographic process whereby a positive multicolor image, made up of dyes of subtractive colors, is formed in an image-receiving stratum of an image- or print-receiving sheet or element. In carrying out multicolor photography, each elemental portion of the photosensitive element, in addition to a suitable silver halide, will preferably contain all of the photographic materials necessary to provide one color component in image dye of a desired subtractive color. The photographic materials which directly participate in or contribute to color image formation are soluble at least in alkaline solution so that a substantially uniform distribution of these materials may be formed in each light-sensitive elemental portion in solution in an alkaline processing liquid absorbed into the photosensitive element.

The photographic materials in each light-sensitive elemental portion which contribute to color image formation are selected to comprise a color-providing substance such as a color former or coupler, or coupling dye and a silver halide developer having at least one oxidation product which is effective so as to at least assist in preventing the color-providing substance present in the exposed regions of each light-sensitive elemental portion from transferring from the photosensitive element and which comprises a substance reactable with the color-providing constituent to give a reaction product which is less mobile in each light-sensitive elemental portion than the color-providing substance itself. Alternatively, the photographic materials may include a dye developer which when oxidized becomes less mobile and is trapped in the light-sensitive element. The invention is put into effect by utilizing these characteristics of the photographic materials to carry out the trapping or immobilization or retention of both the developer and the color-providing substance in exposed regions of each light-sensitive elemental portion upon the development of latent image therein to silver.

For this purpose, one combination of photographic materials comprises a conventional photographic coupler and a standard silver halide color developer having an oxidation product reactable with the coupler. Both of these photographic materials are soluble in alkaline solution and additionally they possess the special characteristics outlined in the foregoing, namely, they may be selected so that the reaction product of the coupler and the oxidation product of the developer are possessed of less mobility in a photosensitive element or less solubility in alkaline solution than the unreacted coupler. The formation of multicolor images and especially transfer images by the use of this combination of photographic materials, namely conventional couplers and standard color developers, is detailed in the previously mentioned application Serial No. 448,441.

Preferred couplers for this embodiment of the invention are those which form azomethine, indaniline and indophenol dyes when reacted with a silver halide secondary color developer in the presence of an oxidizing agent. Such couplers may comprise nitriles, acyl nitriles, thioindoxyls, cyanacetanilides, pyrazolones, phenols, naphthols, substituted ketones, esters and acyl acetanilides. Particularly suitable couplers which are reactable with the oxidation product of a color developer for providing cyan, magenta and yellow dyes, respectively, are 2,4-dichloro-1-naphthol, p-nitrophenyl-methyl pyrazolone and acetoacet-2,5-dichloroanilide or acetoacet-2-chloroanilide.

Standard silver halide color developers for use with the just-described couplers comprise such secondary developing agents as the p-phenylenediamines and others characterized by their ability when oxidized to condense with couplers to form dyes of the above type. Combinations of color developers and couplers which form the least soluble and/or least mobile dyes are preferred since such combinations give the clearest highlights and the sharpest detail to the positive image. As an illustrative example of a standard color developer with which the invention may be practiced, mention may be made of 2-amino-5-diethylamino toluene.

By one practice, the light-sensitive elemental portions comprise a mixture of a suitably sensitive silver halide in which a standard color developer and a conventional coupler have been incorporated. Practices of this nature are well known and include the incorporation of the coupler in an appropriate gelatin solution, following which the developer is added thereto and mixed therewith. The gelatin solution containing coupler and developer is then mixed with the desired silver halide emulsion.

One example of this procedure which details the formation of a light-sensitive elemental portion for providing a cyan component but which is generally available for use with other emulsions, as well as couplers and developers, comprises adding 0.1 gram of 2,6-dibromo-1,5-dihydroxynaphthalene (coupler) to 10 cc. of a solution containing 0.2 gram of gelatin and 0.2 gram of sodium hydroxide. Following the mixture of these ingredients, the gelatin solution is neutralized with 10% hydrochloric acid. At this stage, 0.5 cc. of 85% phosphoric acid is preferably added to the neutralized solution and mixed therewith, following which 0.1 gram of 4-amino-3-propoxy diethylaniline (developer) is thoroughly mixed into the solution and the solution itself is mixed with 50 cc. of an appropriate red-sensitive silver halide emulsion.

Incorporation of the developer and coupler in the silver halide emulsion permits the invention to be practiced with the use of light-sensitive elemental portions which are in the form of a layer one stratum thick. It is generally preferable, however, to employ light-sensitive elemental portions each in the form of a composite layer which is two or more strata thick. By this practice, the composite layer will perforably comprise a photographic materials stratum which is located nearest to the support and which contains a conventional coupler and a standard developer and a stratum of photosensitive silver halide which is supported on the coupler and developer stratum.

In the formation of a photographic materials stratum, the coupler and developer are incorporated in a suitable carrier, i.e., a material which will swell in alkali sufficiently to release the coupler and developer contained therein. Suitable carriers comprise gelatin, zein, polymethacrylic acid, shellac and cellulose acetate hydrogen phthalate, of which the latter may be named as preferred.

By one practice, a photosensitive element, containing in each light-sensitive elemental portion thereof one of the color-providing substances mentioned such as a dye developer or a conventional coupler and a standard color developer, may be utilized to provide multicolor images in subtractive dyes by exposure of the element from the emulsion side to a colored subject, following which an alkaline liquid is spread in contact with said side and a positive print-receiving element, as disclosed in the previously mentioned application Serial No. 448,441. A film unit for carrying out multicolor photography in this manner is illustrated in FIG. 7 as comprising a photosensitive element 400, which is similar to the element illustrated in FIG. 1 and which is shown in superposed relation to a print-receiving element 500 having a rupturable container 600 carried thereon to extend transversely thereof.

The print-receiving element 500 may comprise a single sheet of any liquid-permeable material which is dyeable and, for convenience, is shown in this form. Suitable print-receiving elements are described in said application Serial No. 448,441 and are also detailed in my aforementioned copending application Serial No. 358,012. Container 600 is adapted to releasably hold an aqueous alkaline processing liquid which preferably contains a viscosity-increasing compound such as sodium carboxymethyl cellulose. Details of such containers are found in Land Patent No. 2,634,886, issued April 14, 1953. The liquid processing composition should possess sufficient alkalinity to permit the developer to perform its developing function. Processing compositions of this nature are described in Patent No. 2,559,643, as well as the previously mentioned applications and patent. One such composition comprises a mixture of 5 grams of sodium carboxymethyl cellulose, 3 grams of sodium hydroxide and 100 cc. of water.

As intimated, the element 400 is preferably exposed from the emulsion side thereof. In this regard, it is desirable to hold the elements 400 and 500 together at one end by fastening means (not shown but comprising hinges, staples or the like) and in such manner that the photosensitive element 400 and the print-receiving element 500 may be spread apart from their superposed position whereby to facilitate exposure. When a roll type of film is employed, the photosensitive element and the print-receiving element are wound into separate rolls and the outer free ends of these rolls are connected together as described.

Camera apparatus suitable for processing roll film of the type just mentioned is provided by the Polaroid Land Camera, Model 95, or similar camera structure. Such camera apparatus permits successive exposure of individual frames of the photosensitive element 400 from the emulsion side thereof, as well as an individual processing of an exposed frame by bringing the exposed portion of the photosensitive element 400 into superposed relation with a portion of the print-receiving element 500 while drawing these portions of the film assembly between a pair of pressure rolls which rupture the container 600 and spread processing liquid between and in contact with the photosensitive element and a corresponding registered area of the print-receiving element. The liquid of the processing composition which is spread between the print-receiving element 500 and the photosensitive element 400 permeates into both the negative or photosensitive element and the print-receiving element. In the negative, for example, the coupler and developer in each light-sensitive elemental portion are dissolved in the permeated liquid and are brought, in solution, into contact with the photosensitive strata of the light-sensitive elemental portions to develop the exposed parts thereof to negative silver and form image dye in situ therewith. At the same time, as a result of development, an imagewise distribution of unreacted color-forming components is provided in the unexposed parts of each set of elemental portions.

These imagewise distributions of color-forming components are transferred in solution and by imbibition to the positive print-receiving element which is arranged at such spacing from the negative photosensitive element that the color-forming components in each imagewise distribution will spread or diffuse sidewise or laterally in or on the positive print-receiving element whereby color-forming components transported from adjacent elemental portions will overlap and, upon oxidation of developer contained therein, provide mixtures of subtractive dyes on the print-receiving element which together form the desired positive multicolor print.

The invention also intends to employ a coupling dye or complete dye for the color-providing substance in another combination of photographic materials which participate in image formation. Such a combination of materials comprises said complete dye and, in conjunction therewith, a silver halide developer having at least one oxidation product which, as previously described, is effective so as to at least assist in preventing the color-providing substance present in the exposed regions of each light-sensitive elemental portion from transferring from the photosensitive element and which comprises a substance reactable with the complete dye to give a product which is less mobile in each light-sensitive elemental portion than the complete dye itself. In addition, the dye employed in this combination of photographic materials should be soluble at least in alkaline solution, as is also the case of the developer. A large number of complete dyes are available for the practice of this invention. Details of this embodiment of the invention utilizing a complete dye and a silver halide developer of the character set forth as having an oxidation product reactable with the dye are described and claimed in my aforementioned application Serial No. 358,012.

Many dyes of the character with which this invention is concerned are reactable, as by coupling or other reaction, with an oxidation product of a color developer to provide a reaction product or substance which possesses less mobility in a photosensitive element than the original dye. Reactions of this nature occur when a para-phenylenediamine type of color developer which is employed in the development of a silver halide layer is utilized in conjunction with a complete dye. Similar reactions take place with aminophenol type developers.

In instances where the substance produced by the reaction of a complete dye with an oxidation product of a conventional color developer lacks the desired immobility, there may be employed a non-diffusing developer which has a large molecule whereby the developer, when incorporated in the photosensitive element, remains substantially immobile therein. 4-amino-3,n-butoxydiethyl aniline is an example of a nondiffusing color developer of this nature and has a relatively long carbon chain substituted on the ring. Another example is a ring-substituted para-aminophenol wherein the ring substitution may be in the form of carbon chains. In nondiffusing developers of this type, the long chain will be retained on the developer molecule upon oxidation of the developer so that the product remaining after oxidation will still retain its immobility. Since the complete dye enters into a reaction with this product having the long chain on its molecule, the substance resulting from the reaction will also be retained in the photosensitive element.

The substance formed by the reaction of a complete dye and an oxidation product of the developer may possess color characteristics which are substantially the same as the unreacted dye or which are different from the unreacted dye. A transfer process may be carried out to provide a transfer image comprising dye in unreacted condition or comprising the product of the reaction between transferred dye and the oxidation product of transferred developer. Consequently, in instances where the complete dye is used for transfer image formation, the color of a substance formed by the reaction of an oxidation product of the developer and a complete dye becomes immaterial.

Uniquely, a developer of the bis-benzene-sulfonyl hydrazide type provides an oxidation product which reacts with a complete dye to provide a substance having substantially the same color characteristics as the unreacted dye. On the other hand, the reaction product of a dye and an oxidation product of a standard color developer is a substance which, while it may possess the desired immobility, usually has color characteristics different from the unreacted dye.

For example, 1.5 dihydroxynaphthalene-4-azobenzene is a dye which is reactable with the oxidation product of a developer and which, in unreacted condition, possesses color characteristics suitable for providing a magenta image component. This dye, when reacted with oxidized developer of the bis-benzene-sulfonyl hydrazide type, forms a reaction product possessing substantially the same magenta color characteristics as the complete dye. If, however, 1,5 dihydroxynaphthalene-4-azobenzene is reacted on the print-receiving element with the oxidation product of a standard color developer, for example a developer of the para-phenylenediamine type, the reaction product is grayish. An advantage in the use of bis-benzene-sulfonyl hydrazide as a developer resides in the fact that it is immaterial if bis-benzene-sulfonyl hydrazide which has been transferred to a print-receiving element becomes oxidized and reacts with unreacted dye which has also been transferred since the reaction product formed will have substantially the same color characteristics as the unreacted dye.

Among the classes from which suitable dyes are available, mention may be made of the monoazo, disazo, triphenyl methane, xanthene, thiazine and anthroquinone dyes. The field of dye materials is further extended by the employment of dye substances of the type which react with oxidized developer and which, in unreacted form, may be colorless in a particular environment, for example an acid environment, but upon change in the environment, for example to an alkaline environment, take on a color change. Dye substances of this type include indicator dyes, leuco dyes and carbinols of basic dyes.

Complete dyes of the character with which this invention is concerned are employable in a photosensitive element in the same manner as the conventional couplers previously mentioned, i.e., they are preferably incorporated in a permeable layer or stratum of the photosensitive element which may or may not contain other materials used in the photographic process, as for example silver halide and/or the developer. Dyes of the characteristics described and/or their reaction products should also be stable to light and to photographic solutions.

Dyes which are particularly suited for reaction with an oxidation product of a color developer, including bis-benzene-sulfonyl hydrazide, are found in those dyes having an open position on a ring, which position is para to a hydroxyl or an amino group, or those dyes having a reactive methylene group. Many suitable dyes coming within this classification are found among the azo, pyrazolone and triphenyl methane dyes, specific examples of which comprise the following water- and alkali-soluble dyes such as Fast Crimson 6BL (C.I. 57), for magenta; Fast Wool Yellow (C.I. 636), for yellow; Alphazurine 2G (C.I. 712) and Pontacyl Green SX Extra (C.I. 737), for cyan; and Polychrome Blue-Black (C.I. 201) and Rayon Black GSP (which is commercially available from E. I. du Pont de Nemours & Co., Inc., Organic Chemicals Department), for black; as well as water-insoluble but alkali-soluble dyes such as 1,5 dihydroxynaphthalene-4-azobenzene, for magenta; and Benzene Azo Resorcinol (C.I. 23), for yellow.

In instances where the reaction product of a color developer and a dye possesses undesired color characteristics, the invention intends to employ the unreacted dye molecule for image formation. This is made possible when utilizing para-phenylenediamine or other standard type color developers by preventing the reaction, on the print-receiving element, of dye and developer which have been transferred thereto. In this regard, a number of varied practices are possible for accomplishing this purpose.

By one practice for accomplishing this purpose, there is incorporated in the photosensitive element a developer which possesses a very low solubility in alkali but has good solubility in a high-boiling-point organic solvent. An example of such a developer is 4-amino-di-n-butyl-aniline. Procedures for carrying out this practice are known to the art and are set forth in Patent No. 2,478,400 as well as in the previously mentioned application Serial No. 448,441. Due to the fact that the developer is of low solubility in alkaline solution, its mobility will be substantially restricted to the negative or photosensitive element.

Briefly stated, practices for incorporating a developer which is difficultly soluble in alkali in a photosensitive layer are carried out by dissolving the free base of the developer in a high-boiling-point solvent such as triphenyl phosphate. The solution thus formed is then emulsified in a dilute gelatin solution containing an emulsifying agent, as for example alkyl lauryl sulfate, and an appropriate amount of the emulsified product is added to a suitable quantity of a silver halide emulsion and is thoroughly mixed therewith. This procedure is also available for incorporating a dye in a silver halide emulsion which, along with the free base of the developer, may be dissolved in the aforementioned high-boiling-point solvent. However, since the dye is also soluble in alkali, it may be transferred in alkaline solution from the photosensitive element.

Alternatively, a relatively immobile or nondiffusing color developer, of the character previously mentioned, may be incorporated in the negative element as, for example, a developer having a long chain on its molecule such as 4-amino-3-n-butoxydiethylaniline. As a further alternative, the print-receiving element may include, as an image-receptive material, a plastic layer which is of a character displaying a greater affinity for dye than for developer. An example of a receiving sheet material and a dye of the just-mentioned characteristics is a receiving sheet of partially hydrolyzed polyvinyl acetate and the previously mentioned magenta dye, 1,5 dihydroxynaphthalene-4-azobenzene. As a still further means for controlling reaction of the dye in the print-receiving element, a strong reducing agent such as hydroquinone may be incorporated in the positive print-receiving element to prevent oxidation of any transferred developer and consequent coupling reaction. These and similar practices are useful individually or in various combinations for the purpose of preventing the reaction of a transferred dye molecule with developer.

Where the light-sensitive elements are of the composite type, the photographic material layers 12, 22 and 32 may comprise a liquid-permeable carrier material in which the dye and the developer are incorporated or these layers may each be formed by coating a solution of a dye and a developer in a volatile solvent onto the film support 40 or an insulating stratum 23 or 33. In any event, these layers containing dye and developer are penetrable by liquid processing composition.

The composite types of elemental portions illustrated herein are particularly suited for use with alkali-soluble but substantially water-insoluble dyes. When a dye which is water- and alkali-soluble is employed, it is preferable to include a barrier layer or stratum in the structure of the light-sensitive elemental portion at a location between the layer containing the dye and the developer and the photosensitive stratum whereby to avoid possible desensitization of the photosensitive material. The barrier layer is effective to prevent dye from being absorbed into an emulsion in water contained in the emulsion during the application thereof to the photosensitive element whereby to avoid possible desensitization of the photosensitive material. Such a barrier may be formed of the material employed for the carrier in the photographic material stratum and may comprise cellulose acetate hydrogen phthalate. Details for the construction of elemental portions wherein a water-soluble dye is employed may be gained from my previously mentioned application Serial No. 358,012.

Additionally, it is within the concept of the invention, when utilizing complete dyes of the character described, to incorporate a complete dye in a light-sensitive elemental portion which is one layer thick. In this regard, the dye and the developer may be added to a photosensitive emulsion in the manner previously described for the addition thereto of a coupler and a developer. In this concept, precautions such as those described may be utilized to prevent unreacted developer from oxidizing on the print-receiving element when the transfer image comprises the complete dye. Possibilities of emulsion desensitization by a dye incorporated in the emulsion are avoided by the use of a dye which exerts a minimum desensitizing effect upon silver halide, or the use of a dye which is water-insoluble but alkali-soluble, or by encasing the dye in particles comprising hardened gelatin and distributing the dye-containing particles throughout the silver halide emulsion as shown in U.S. Patent No. 2,618,553, or by any combination of these practices.

Indicator dyes, leuco dyes and carbinols of basic dyes, i.e., dye substances which are capable of assuming a color change, are well adapted for use with a photosensitive element having light-sensitive elemental portions of the single layer type. Dye substances of this nature should preferably be colorless or yellow or slightly so in an acid or neutral environment. Such dye substances are intended to be transferred from the unexposed regions of a photosensitive element and deposited on a print-receiving element where the dye deposit is utilized for transfer image formation substantially without reaction of the deposited dye and oxidized developer. As specific examples of such dyes, mention may be made of indicator dyes such as 2,5-dinitrophenol, quinaldine red and quinoline blue, having, respectively, a yellow, a red and a blue color, at a relatively high pH but being substantially colorless in a neutral environment. To provide an acid environment in the photosensitive element, a suitable acid, such as an appropriate amount of phosphoric acid, may be added to each emulsion that is employed. Alkali contained in the processing liquid will, in general, provide the needed alkaline environment for creating the desired color change, although an alkali, for example sodium carbonate, may be incorporated in the print-receiving element.

In instances where an oxidation product of a developer reacts with a color-providing substance such as a coupler or a dye to provide a substance of desired color, developer is employed in a quantity controlled to avoid highlight stain in the transfer image. By this control, developer is utilized in a unit area of the layer, adapted to have the developer incorporated therein, in a quantity just sufficient to be completely oxidized by a fully developable or completely exposed silver halide portion of similar unit area. However, in cases where the developer is bis-benzene-sulfonyl hydrazide or where the developer is kept out of the print-receiving element, an excess of developer may be utilized.

In general, coupler or dye incorporated in a layer or stratum in a unit area thereof similar to that described is preferably of a quantity just sufficient to be entirely reacted by that amount of developer which is oxidized by the development of a completely exposed unit area of the photosensitive layer. This procedure is likewise for the purpose of avoiding highlight stain in the transfer image. However, when a dye is employed in the photosensitive element which has a sufficiently low solubility rate, it is possible to use dye in excess of that just specified.

Formation of a multicolor transfer image by the employment of a photosensitive element which utilizes dye and a developer having an oxidation product reactable with the dye is carried out in a manner similar to that described in connection with photosensitive elements which employ couplers and a color developer as the materials which participate in color image formation and needs no detailed explanation. However, it should be kept in mind that image formation in the print-receiving element, in instances where a dye is employed as the color-providing substance, may be by means of the transferred dye itself or the substance formed upon the reaction of transferred dye and an oxidation product of developer which has been transferred to the print-receiving element.

The composite type of light-sensitive elemental portion has been illustrated as having a construction wherein the developer and the color-providing substance are located in a stratum in back of the photosensitive stratum or between the photosensitive stratum and the support of the photosensitive element. This construction is generally preferred in carrying out a transfer process since it facilitates control of the reactants to the end of achieving substantially complete trapping or immobilization of the color-providing substance and developer utilized in forming the negative image in the photosensitive element with consequent avoidance of highlight color in the positive.

However, the preferred construction is subject to considerable variation. For example, a layer or stratum containing the color-providing substance and developer may be located in front of the photosensitive layer. Also, the developer and the color-providing substance may be incorporated in individual strata of each elemental portion, including the incorporation of one of these materials in the photosensitive element itself. Furthermore, in certain instances, it is possible to omit the developer from each light-sensitive elemental portion and to include it in the alkaline liquid used for processing purposes.

In another form of the invention, developers which are dyes themselves are provided as the color-providing substances in the light-sensitive elemental portions. In this form the unreacted portions of the developer in each elemental portion are utilized to provide the dye image so that, in effect, development of silver controls transfer of the dye. With few exceptions, dyes of almost all classes are useful for this purpose when a developing function has been added or attached to the dye molecule. These include azo dyes to which, as a developing function, has been added an aminonaphthol or a p-methyl-aminophenol, or azo dyes and anthraquinone dyes to which one or more hydroquinones have been attached as the developing function.

The developing function can be part of the dye, for example the aminonaphthol group in the dye developer, 1-amino-2-naphthol-4-azobenzene; or the developing function can be insulated from the dye, for example a hydroquinone attached through a sulfonyl group to the dye molecule. Dye developers useful in the present invention are described in detail in my aforementioned copending application Serial No. 415,073, and examples of dye developers selected for their ability to provide colors useful in the present invention in carrying out subtractive color photography include dye developers possessing an appropriate yellow color such as 2-naphthylazohydroquinone and phenylazohydroquinone, dye developers for magenta such as 2-hydroxynaphthylazohydroquinone and 1-amino-2-naphthol-4-azobenzene, and a dye developer for a cyan colored dye such as 1,4-bis-(dihydroxyanilino)-anthraquinone.

The consideration which has been heretofore presented with regard to the structural details and the use of the photosensitive elements disclosed herein for the production of multicolor dye images will point the way for appreciation of variations by which the inventive concept is extended to other applications and uses.

For example, it is possible to include materials, other than those just mentioned, in each light-sensitive elemental portion. For example, in certain instances it may be desirable to incorporate an appropriate silver halide solvent or transfer agent in one or more sets of light-sensitive elemental portions.

By way of illustrating the versatility of the photosensitive elements shown herein, it is pointed out that they are easily adapted for carrying out an additive color process making use of a color screen for taking and viewing purposes. Such practices will require only some modification in the materials used in the various light-sensitive elemental portions without the modification of the general structure of the photosensitive element or the light-sensitive elemental portions themselves. This is due to the fact that the photosensitive elements are constructed with light-sensitive elemental portions arranged on a support in a screen pattern which is of the nature of an additive color screen.

When used in carrying out additive color photogrpahy, the photosensitive elements of the invention will utilize light-sensitive elemental portions of the composite type wherein each light-sensitive elemental portion includes a stratum, such as the strata 12, 22 and 32, of a suitably sensitive photosensitive material. Likewise, when needed, each light-sensitive elemental portion will include an insulating stratum such as the strata 23 and 33 and a light-filtering stratum such as the strata 24 and 34.

When used for carrying out an additive screen process, the major modification in the individual light-sensitive elemental portions will involve the stratum of photographic materials. In place of a color developer, a black and white developer is used, such for example as hydroquinone. The developer may be contained in an individual stratum of each light-sensitive elemental portion, or it may be dissolved in the alkaline processing composition. Also, in place of a color-providing substance which is reactable with the oxidation product of the developer, the light-sensitive elemental portions will include a dye material which is adapted to provide screen dye and which is unreactable with the developer or its oxidation product or which is prevented from reacting therewith. The screen dye material should be soluble in water and/or an aqueous alkaline solution and should possess an appropriate color for one component of an additive color screen, i.e., blue, green or red. In this regard, the screen dye material may comprise an individual dye of the appropriate color or a mixture of dyes which provide the appropriate color.

Additionally, for additive color work, a silver halide transfer agent or silver halide solvent may be included in a stratum of each light-sensitive elemental portion if the transfer agent is of a water-insoluble material such as barbituric acid. On the other hand, if a water-soluble transfer agent or silver halide solvent such as sodium thiosulfate is employed, this material is included in the alkaline processing solution which is permeated into the photosensitive element.

A photosensitive element of the additive nature described may be utilized to provide an additive color print by exposing the element from the emulsion side thereof and as a negative material to a colored subject. Following exposure, an alkaline liquid is spread in contact with the emulsion side of the photosensitive element and a positive print-receiving element which is preferably of a transparent material. The liquid of the processing composition permeates into both the negative and the print-receiving element. In the negative, screen dye and developer in each light-sensitive elemental portion are dissolved in the permeated liquid. Likewise, developer and silver solvent in solution in the liquid permeated into the photosensitive element will be brought into contact with the photosensitive strata of the individual light-sensitive elemental portions. The developer develops the exposed parts of the light-sensitive elemental portions to negative silver. As a result of development, an imagewise distribution or a differential disposition of a soluble silver complex is formed in solution in unexposed parts of the light-sensitive elemental portions because of the action of the transfer agent which has been dissolved in the processing liquid. At the same time, a nonimagewise or uniform distribution of screen dye material in solution in the processing liquid is formed in each light-sensitive elemental portion of the negative.

These imagewise distributions of silver complex are transferable, at least in part and in solution and by imbibition, to the positive print-receiving element which is arranged in such close proximity to the negative photosensitive element as to substantially prevent sidewise diffusion thereof where they are depositable to provide, upon the reduction of the silver complex, a positive silver image. At the same time, the uniform distributions of screen dye material are similarly transferable, at least in part and in solution and by imbibition, to the print-receiving element where they are deposited to reproduce the screen pattern of the photosensitive element in at least a dyeable stratum carried on the surface of the print-receiving element located next to the photosensitive element. The result is the provision of a positive silver image with an additive color screen thereon through which the positive is viewable to provide an additive color print. Following image formation and screen dye deposit, the print-receiving element, including the stratum thereon containing the reproduced color screen, is separated from the photosensitive element as by stripping apart.

During the just-described transfer, the photosensitive element and the print-receiving element are held against relative movement with respect to each other in directions parallel to the planes of the layers of the film assembly. This just-noted factor permits the color screen deposited in the print-receiving stratum and the positive print formed therein to be located in register with each other and with the negative image developed in the photosensitive layer.

One embodiment of a photosensitive element suitable for carrying out an additive color type of transfer process utilizes light-sensitive elemental portions which individually employ a red-sensitive or a blue-sensitive or a green-sensitive silver halide stratum. In this embodiment of a photosensitive element, the stratum containing the screen dye is preferably located back of the photosensitive stratum, i.e., between the photosensitive stratum and the support for the photosensitive element, in each light-sensitive elemental portion. By this arrangement, the screen dyes which are located in back of the selectively sensitive emulsion strata will have no effect upon the exposure of the element. Exposure control is effected through the use of suitable filter media, such as the yellow filter material heretofore mentioned, associated with appropriate light-sensitive elemental portions in front of the photosensitive strata thereof. Such a construction presents advantages over conventional types of additive negatives where the exposure is made through the screen layer as, for example, in the Dufay screen process.

These advantages derive from the fact that there is no need to compromise between the absorption characteristics of the screen dyes and the sensitivity ranges of the emulsions employed so that screen dyes having the most desirable absorption characteristics for viewing purposes may be used. Additionally, this arrangement is advantageous since it permits the use of emulsions having overlapping sensitivities whereby to obtain better color rendition and also faster emulsion speeds.

However, the practice of the invention includes within its scope the use of a photosensitive element wherein the screen dyes are located in front of the photosensitive element and are used for taking, as well as viewing, purposes. In this instance, the screen dyes provide the exposure control of the photosensitive strata which comprises a panchromatic silver halide emulsion of the same characteristics in each light-sensitive elemental portion.

As previously pointed out, screen dyes which are transferred to a print-receiving element should be at least soluble in alkaline solution. However, when a screen dye is to be retained in a photosensitive element for the production of a color negative, the dye should be water- and alkali-insoluble by itself or when protected by a suitable plastic. Additionally, any additive screen dye should be substantially unreactable with black and white developers or oxidation products thereof. Likewise, a screen dye should preferably exert no desensitizing effect upon silver halide when intimately mixed therewith. Any dye possessing the characteristics just described may be utilized for carrying out additive screen practices.

However, even dyes which exert a desensitizing effect upon silver halide may be controlled when incorporated in a separate stratum from the photosensitive stratum whereby to avoid desensitization. For example, dyes of this nature may be incorporated in a suitable carrier such as cellulose acetate hydrogen phthalate.

Specific examples of water-soluble dyes suitable for use as screen components comprise Fast Fushine G (C.I. 29), Tartrazine, and Alphazurine 2B (C.I. 712), which are dyes respectively possessing the subtractive colors of magenta, yellow and cyan. For providing the additive color red, aqueous solutions of the magenta dye and the yellow dye are appropriately mixed, as is well understood by the art. Green is provided by mixing cyan and yellow dye solutions, while blue is provided by a mixture of aqueous solutions of magenta and cyan. It will be noted that the dyes given in this specific example are also characterized by being reactable with the oxidation product of color developers of the para-phenylenediamine type, as well as with developers of the bis-benzene-sulfonyl hydrazide type. However, in an additive screen process, these dyes are utilized with a black and white developer which is itself unreactable with the dyes and has no oxidation product which is reactable therewith.

In general, most dyes will not precipitate in a viscous reagent, such as carboxymethyl cellulose, usually employed in the liquid processing composition spread between the photosensitive and print-receiving elements. Screen dyes included in the specific examples given are of this character. When such dyes are used, the print-receiving element or at least a stratum thereon should be, as previously described, of a dyeable nature and should be strippable from the layer formed by a viscous processing liquid spread between the photosensitive and print-receiving elements. A suitable dye-receiving stratum of this nature comprises polyvinyl alcohol.

However, certain dyes will precipitate in a layer of a viscous processing composition such as one containing carboxymethyl cellulose. Examples of such dyes are disazo and trisazo dyes, that is, direct dyes for cellulose, of which Congo red is an example. In this instance, the layer formed by the viscous liquid spread between the photosensitive and print-receiving elements should be strippable with the print-receiving element from the photosensitive element and should remain adhered to the print-receiving element.

When dyes are to be precipitated in the layer formed by a viscous processing liquid which is spread between the photosensitive and print-receiving elements, it may be desirable to include a dye precipitating agent and a silver precipitating agent in the processing liquid. A developer such as that discussed in U.S. Patent No. 2,662,822, granted to Edwin H. Land on December 15, 1953, contains such a silver precipitating agent. For dyes such as disazo dyes, carboxymethyl cellulose, as indicated above, is a good dye precipitant. For other dyes, aluminum hydroxide may be included in the liquid processing composition. As an alternative procedure, a dye precipitant may be coated in a layer over the surface of the photosensitive element which will be located adjacent to the print-receiving element for processing.

Transfer processes involving the use of color screens in conjunction with silver images are in general described in U.S. Patent No. 2,614,926, issued to Edwin H. Land on October 21, 1952, and also in U.S. Patent No. 2,707,150, issued to Edwin H. Land on April 26, 1955.

The photosensitive elements of this invention are adapted for a wide variety of uses leading to the formation of negative images as well as positive images. Such images may be in color or in black and white, or they may be in both color and black and white. In color work, as previously indicated, the images may result from carrying out either additive or subtractive color photography.

In regard to black and white reproduction, it will be apparent from the foregoing that a photosensitive element having two or more sets of light-sensitive elemental portions which are selectively exposable by light of different wavelengths may be processed in conjunction with a receiving sheet to provide, by transfer, a composite black and white record which is representative of the individual color separation records of the object to which the photosensitive element is exposed. Inasmuch as color-providing substances are not utilized in such a procedure to form either a negative or a positive image, there will be no image dye provided in the print-receiving element. A positive transfer record of this character may be utilized to provide a multicolor image when the record is viewed through a separate additive color screen which is held in suitable registration with the positive.

It will also be appreciated that the photosensitive elements disclosed herein may be modified to provide by transfer on a print-receiving element an image which is a composite record of a colored subject in terms of one or more colors and of silver. This modification may be practiced with a photosensitive element in which a color-providing substance is omitted from the light-sensitive elemental portions in one set of light-sensitive elemental portions while being included in the light-sensitive elemental portions of each other set. A photosensitive element of this nature is useful in connection with camouflage detection when the light-sensitive elemental portions from which a color-providing substance is omitted is provided with infrared-sensitive silver halide.

The foregoing discussion has been directed primarily to the formation of images by transfer on a print-receiving element. It is, however, to be observed that the taking elements described herein may be processed to provide black and white negatives or to provide color negatives in both subtractive and additive colors.

For example, a taking element having sets of selectively exposable light-sensitive elemental portions which are free of color-providing substances may be developed to a negative record and fixed by conventional practices. Preferably, the fixing solution will include an organic solvent capable of penetrating any insulating stratum, such as the stratum 23 or 33, which separates a light-sensitive elemental portion from photosensitive material upon which the elemental portion is supported whereby to remove unexposed and/or undeveloped silver halide located between the insulating stratum and the base or support of the photosensitive element.

As one example, a photosensitive element developed in the manner just set forth to a black and white negative is useful to provide a multicolor positive image in subtractive dyes on positive high contrast film used in multicolor reproduction. This may be carried out by successively printing the individual color separation records of the black and white negative on the positive material through the use of an appropriately designed opaque screen arranged at each printing exposure to block off light transmission through elemental portions containing unwanted color records.

Also, a photosensitive taking element of the type which incorporates appropriate screen dyes in the individual light-sensitive elemental portions thereof to provide a color screen may be processed by conventional procedures to provide an additive color screen negative. Preferably, screen dyes are selected so that they are substantially insoluble in aqueous alkaline solutions, as well as in organic solvents, but which are bleachable. In forming a photosensitive taking element of this character, the procedure described in regard to the solvent stripping technique discussed in connection with FIGS. 5, 6a and 6b is utilized to provide the first set of light-sensitive elements. Dye which is present in depressed portions following any embossing step is appropriately bleached before the various strata providing the next set of light-sensitive elemental portions are doctored into the depressed sections of the element.

A black and white negative of the nature having a color screen may be used to print on conventional subtractive multicolor material or film to provide positive reproductions. Of added importance is the fact that a taking element having dye strata providing an additive screen may be reversal-processed to provide an additive color screen positive in the taking element.

Also, a taking element, having light-sensitive elemental portions which each includes a stratum containing a color-providing substance capable by itself or upon reaction with another material of providing a subtractive image dye, may be processed to provide a multicolor negative in subtractive dyes. Conventional photographic processing practices employing an appropriate developer of the paraphenylenediamine type or the bis-benzene-sulfonyl hydrazide type, a fixer and silver bleach are utilized for this purpose. Also, a taking element, having light-sensitive elemental portions which each includes a conventional coupler reactable with the oxidation product of a standard color developer to provide a subtractive dye, may be processed to provide a multicolor negative in terms of such dyes.

A negative element having a multicolor image formed of subtractive dyes is useful in reproducing positives on conventional multicolor film of high contrast material. Furthermore, a taking element capable of having a subtractive color negative formed therein by the just-outlined procedure may be reversal-processed by conventional methods to provide a color positive of subtractive dyes.

As a variation in the just-described practices for forming negative images of subtractive dyes in the taking element itself, it is to be noted that more accurate color rendition is obtainable by utilizing couplers adapted to provide subtractive dyes which are relatively soluble in the processing solutions and by allowing the dyes formed by coupling reaction to diffuse in overlapping relation into a permeable stratum which is coated over the emulsion side of the taking element and covers the outer faces of all the light-sensitive elemental portions of the photosensitive element. Such a stratum should be of a material, for example an appropriate plastic, to which the dyes formed on coupling are substantive. Additionally, such a stratum may contain a dye mordant.

Throughout the drawings, the light-sensitive elemental portions have been illustrated and described as being of rectangular shape. Light-sensitive elemental portions of rectangular shape will, in general, facilitate the processing needed for producing the various photosensitive elements. However, light-sensitive elemental portions may possess other shapes. For example, they may be dot-like or have similar geometrical forms and may be arranged in rows whereby they are positionable in the desired contiguous and interspersed relationship needed to provide a screen type of pattern for the light-sensitive portions of the photosensitive element.

In forming the various photosensitive elements illustrated herein, the light-sensitive elemental portions have been mounted upon the support in the order of first the blue-sensitive portions, then the green-sensitive portions and then the red-sensitive portions. Such an order simplifies manufacture inasmuch as both the blue-sensitive and the green-sensitive elemental portions may be handled under safe light, i.e., yellow light for the blue-sensitive portions and red light for the green-sensitive portions. However, other orders of application may be used as will be well understood by the art.

Since certain changes may be made in the above product and process without departing from the scope of the invention herein involved, it is intended that all matter contained in the above description or shown in the accompanying drawings shall be interpreted as illustrative and not in a limiting sense.

What is claimed is:

1. The method of manufacturing a photosensitive element having at least two sets of submacroscopic light-sensitive elemental portions systematically arranged in a screen pattern, said method comprising embossing the surface of a support to form a relief impression having systematically arranged spaced-apart elevated surface sections joined by depressed surface sections interspersed therebetween, forming a first light-sensitive layer of substantially uniform thickness on said embossed surface of said support, said first light-sensitive layer having a predetermined effective spectral sensitivity and containing a first color-providing substance selected from the class consisting of a first dye and intermediates for said first dye, and filling the depressions remaining in the surface of said element to the level of the raised sections thereof with a second light-sensitive material having a predetermined effective spectral sensitivity substantially different from the spectral sensitivity of said first light-sensitive layer and containing a color-providing substance selected from the class consisting of a second dye and intermediates for said second dye.

2. The method of manufacturing a photosensitive element as defined in claim 1 wherein an insulating layer is inlaid in each of said depressions underlying said second light-sensitive material for preventing the transfer of constituents outwardly from said first light-sensitive layer, said insulating layer comprising a material which is at least difficultly permeable to aqueous fluids.

3. The method of manufacturing a photosensitive element as defined in claim 1 including the additional steps of embossing said element to form a second relief impression having systematically arranged spaced-apart elevated surface sections joined by depressions interspersed therebetween, and filling the last-mentioned depressions to the level of the last-mentioned elevated surface sections with a third light-sensitive material having a predetermined effective spectral sensitivity substantially different from the effective spectral sensitivities of said first light-sensitive layer and said light-sensitive material and containing a color-providing substance selected from the class consisting of a third dye and intermediates for said third dye.

4. The method of manufacturing a photosensitive element having at least two sets of submacroscopic light-sensitive elemental portions systematically arranged in a screen pattern, said method comprising forming a first light-sensitive layer of substantially uniform thickness on the surface of said support, said first light-sensitive layer having a predetermined effective spectral sensitivity and containing a first color-providing substance selected from the class consisting of a first dye and intermediates for said first dye, embossing said element, including said light-sensitive layer, to form a relief impression having systematically arranged spaced-apart elevated surface sections joined by depressions interspersed therebetween, and filling said depressions to the level of said raised surface sections with a second light-sensitive material having a predetermined effective spectral sensitivity substantially different from the spectral sensitivity of said first light-sensitive layer and containing a color-providing substance selected from the class consisting of a second dye and intermediates for said second dye.

5. The method of manufacturing a photosensitive element as defined in claim 4 wherein an insulating layer is inlaid in each of said depressions underlying said second light-sensitive material for preventing the transfer of constituents outwardly from said first light-sensitive layer, said insulating layer comprising a material which is at least difficultly permeable to aqueous fluids.

6. The method of manufacturing a photosensitive element as defined in claim 4 including the additional steps of embossing said element to form a second relief impression having systematically arranged spaced-apart elevated surface sections joined by depressions interspersed therebetween, and filling the last-mentioned depressions to the level of the last-mentioned elevated surface sections with a third light-sensitive material having a predetermined effective spectral sensitivity substantially different from the effective spectral sensitivities of said first light-sensitive layer and said second light-sensitive material and containing a color-providing substance selected from the class consisting of a third dye and intermediates for said third dye.

References Cited in the file of this patent

UNITED STATES PATENTS

| | | |
|---|---|---|
| 742,405 | Eichengrun et al. | Oct. 27, 1903 |
| 1,263,962 | Thornton | Apr. 23, 1918 |
| 1,290,794 | Sheppard | Jan. 7, 1919 |
| 1,903,783 | Frankenburger et al. | Apr. 18, 1933 |
| 2,234,997 | Yanes | Mar. 18, 1941 |
| 2,269,158 | Martinez | Jan. 6, 1942 |
| 2,323,752 | Howey | July 6, 1943 |
| 2,441,609 | Yanes | May 18, 1948 |
| 2,614,926 | Land | Oct. 21, 1952 |
| 2,698,794 | Godowsky | Jan. 4, 1955 |
| 2,707,150 | Land | Apr. 26, 1955 |
| 2,756,142 | Yutzy | July 24, 1956 |
| 2,968,554 | Land | Jan. 17, 1961 |

FOREIGN PATENTS

| | | |
|---|---|---|
| 448,863 | Great Britain | June 10, 1936 |